United States Patent [19]
Garrison et al.

[11] 4,348,615
[45] Sep. 7, 1982

[54] DISCHARGE LAMP OPERATING CIRCUIT

[75] Inventors: Robert L. Garrison, Henniker, N.H.; Harold L. Rothwell, Jr., Rowley, Mass.

[73] Assignee: GTE Products Corporation, Stamford, Conn.

[21] Appl. No.: 164,866

[22] Filed: Jul. 1, 1980

[51] Int. Cl.³ .............................................. H05B 37/02
[52] U.S. Cl. ..................................... 315/219; 315/177; 315/239; 315/244; 315/DIG. 7
[58] Field of Search ................. 315/177, 219, DIG. 7, 315/244, 239

[56] References Cited
U.S. PATENT DOCUMENTS

| | | | |
|---|---|---|---|
| 3,247,422 | 4/1966 | Schultz | 315/DIG. 7 |
| 3,882,354 | 5/1975 | May | 315/DIG. 7 |
| 4,023,067 | 5/1977 | Zelina | 315/177 |
| 4,145,636 | 3/1979 | Doi | 315/DIG. 7 |
| 4,234,823 | 11/1980 | Charlot | 315/DIG. 7 |

Primary Examiner—Harold A. Dixon
Attorney, Agent, or Firm—Edward J. Coleman

[57] ABSTRACT

A lamp operating circuit comprising a DC power source, an inverter including step-up transformer inductance windings and a controlled transistor switch connected across the output of the DC source, and a high frequency oscillator coupled to the transistor switch for operating the same at predetermined intervals. A low wattage HID lamp is connected across the inverter through a ballast capacitor series connected to one terminal of the lamp and a ballast inductance coupled in series with the other lamp terminal. The ballast inductance and ballast capacitor are selected to resonate sinusoidally at a frequency having a half period coinciding with the on-time of the transistor.

8 Claims, 4 Drawing Figures

DISCHARGE LAMP OPERATING CIRCUIT

BACKGROUND OF THE INVENTION

This invention relates to discharge lamp operating circuits, and more particularly, to high frequency circuits for efficiently operating low wattage, high intensity discharge (HID) lamps.

Conventional ballast circuits for operating HID lamps have been constructed from leakage reactance transformers and may or may not include a spike or pulse starter. Typically, the discharge current through the lamp is controlled by the inductive reactance of the transformer core at a 60 Hz line frequency. As will be discussed hereinafter, such ballasts are not particularly suitable for the much smaller size, lower wattage high pressure metal halide arc discharge lamps currently being introduced. For example, one such lamp is discussed in U.S. Pat. No. 4,161,672, which also describes the use of double-ended arc tubes for such lamps. Further, a copending application U.S. Ser. No. 132,933, filed Mar. 24, 1980 and assigned to the present assignee, describes a low wattage metal halide arc discharge lamp having a press-sealed single-ended arc tube, that is to say, an arc tube in which both electrodes are located in a press-seal at one end of the arc tube. Practical designs of such lamps have ranged from 100 watts to less than 10 watts.

A ballast intended for such low power arc discharge lamps, particularly of the metal halide group, must satisfy at least the following requirements:

(a) produce glow-to-arc conversion across the electrodes;
(b) maintain sufficient open circuit voltage to overcome any lamp voltage reignition during warm-up; and
(c) control lamp power efficiently.

Ballast circuits designed to operate HID lamps at the line frequency (e.g., 60 Hz) generally satisfy the first requirement by producing output open circuit voltages of at least a factor of two above the input line voltage. Unless the open circuit voltage approaches 500–600 volts, however, a series igniter pulse of several kilovolts is generally employed to promote the initial interelectrode glow breakdown. In addition, the need for high open circuit voltage ballast circuits is greatest for the metal halide lamps where reignition voltages can be several hundred volts. As a consequence of high open circuit voltage, the ballast circuit is usually only 50–60% efficient at converting the electrical input power into the discharge.

An unfortunate characteristic of the aforementioned miniature, low-wattage metal halide lamps is the very rapid plasma deionization to which they are subject. For example, in operation on 60 Hz alternating current, deionization may nearly eliminate charge carrying species between half cycles so that a very high restriking voltage is required to be provided by the ballast. In view of these deionization limitations associated with low frequency operation of miniature metal halide HID lamps, the use of conventional 60 Hz ballasts has many disadvantages.

Accordingly, in the interests of a compact and efficient design, high frequency ballast operation of such lamps has been described, such as, for example, in U.S. Pat. No. 4,170,746. Our invention is particularly concerned with providing further improvements in overall system efficiency in addition to other advantages.

SUMMARY OF THE INVENTION

Accordingly, it is an object of the present invention to provide an improved circuit for operating a high intensity discharge (HID) lamp.

A particular object of the invention is to provide a more efficient ballast circuit for high frequency (i.e., in the kilohertz range) operation of a low wattage (i.e., 10 to 100 watts) arc discharge lamp.

Yet another object of the invention is to provide a simple HID lamp operating circuit employing semiconductor components and which is small, light weight and efficient.

These and other objects, advantages and features are attained, in accordance with the invention, by a circuit comprising, in combination, a DC power source, a first inductance means and a controlled switch means series connected across the power source, a second inductance means coupled across the output terminals of the power source, and an oscillator coupled to the controlled switch means for repetitively operating the same at predetermined intervals, whereby the controlled switch means and first and second inductance means, function as an inverter having an AC output across the combination of the first and second inductance means. For connecting the first and second terminals of a low wattage HID lamp across the inverter, the circuit further includes a ballast capacitor means coupled between the first inductance means and the first terminal of the lamp, and a ballast inductance means is coupled between the second inductance means and the second terminal of the lamp. A voltage multiplier starting circuit is connected across the first and second terminals of the lamp to promote initial interelectrode breakdown. Thereafter, of course, the starting circuit is substantially shorted out during normal lamp operation. The first and second inductance means of the circuit function as a transformer to step up the voltage applied across the lamp, and the oscillator has a frequency in the kilohertz range, e.g., of the order of 20 kilohertz, whereby operation of the controlled switch means by the oscillator provides an output from the inverter in that kilohertz frequency range. The circuit further includes a first diode means connected across the control switch means and a second diode means series connected between the second inductance means and an output terminal of the power source.

The circuit may further include a third inductance means connected between the ballast inductance means and the junction of the second inductance means and second diode means, whereby the ballast inductance means, lamp, and ballast capacitor means are series connected across the combination of the first, second and third inductance means. The third inductance means functions to further step up the voltage applied across the lamp, and the first inductance means has an inductance value selected to store an amount of energy approximately equal to W/f during the conducting period of the switch means, where W is the power rating of the lamp and f is the frequency of the oscillator.

Of particular significance to the advantages attained by the invention, the ballast inductance means is selected to resonate with the ballast capacitor means whereby the switching current waveform is substantially a half sinewave pulse, with both the turn-on and turn-off transition of the switching means occurring at zero current, thereby substantially eliminating switching losses, and wherein the ballast inductance means is operative during the conducting period of the switch means to provide an impedance load in the lamp circuit for permitting full conduction of the switch means with a minimized power loss.

In a preferred embodiment, the controlled switch means is a transistor having base, collector and emitter electrodes, the base being coupled to the output of the oscillator, and the collector and emitter electrodes being coupled in a series circuit between the first inductance means and an output terminal of the power source. The first diode is connected across the emitter and collector electrodes of the transistor as a reverse current bypass, and the second diode is series connected with the second inductance means across the output of the DC power source. This second diode is selected to prevent the voltage across the transistor collector emitter electrodes from exceeding a predetermined value. The described first, second, third and ballast inductance means comprise respective windings on a common core. The ballast inductance means and ballast capacitor means are selected to resonate sinusoidally at a frequency having a half period which coincides with the on-time of the transistor, thereby substantially eliminating switching losses.

In brief, therefore, the preferred embodiment of this circuit comprises an oscillator driven transistor switched inverter having an inductive-capacitive ballast for operating the arc lamp. A current waveform shaping inductance is connected in series with the lamp to permit full turn-on of the transistor with minimized losses, and the value of this series inductance is selected to resonate with the series ballast capacitor such that the transistor current waveform is a half sinewave pulse, with both transistor turn-on and turn-off at a current of zero, thereby eliminating switching losses. In addition to cooperating with the series inductance to improve overall system efficiency, the series ballast capacitor also contributes toward elimination of the problem of lamp rectification that occurs with pure inductive ballasts.

BRIEF DESCRIPTION OF THE DRAWINGS

This invention will be more fully described hereinafter in conjunction with the accompanying drawings in which.

DESCRIPTION OF PREFERRED EMBODIMENT

Figure 1:
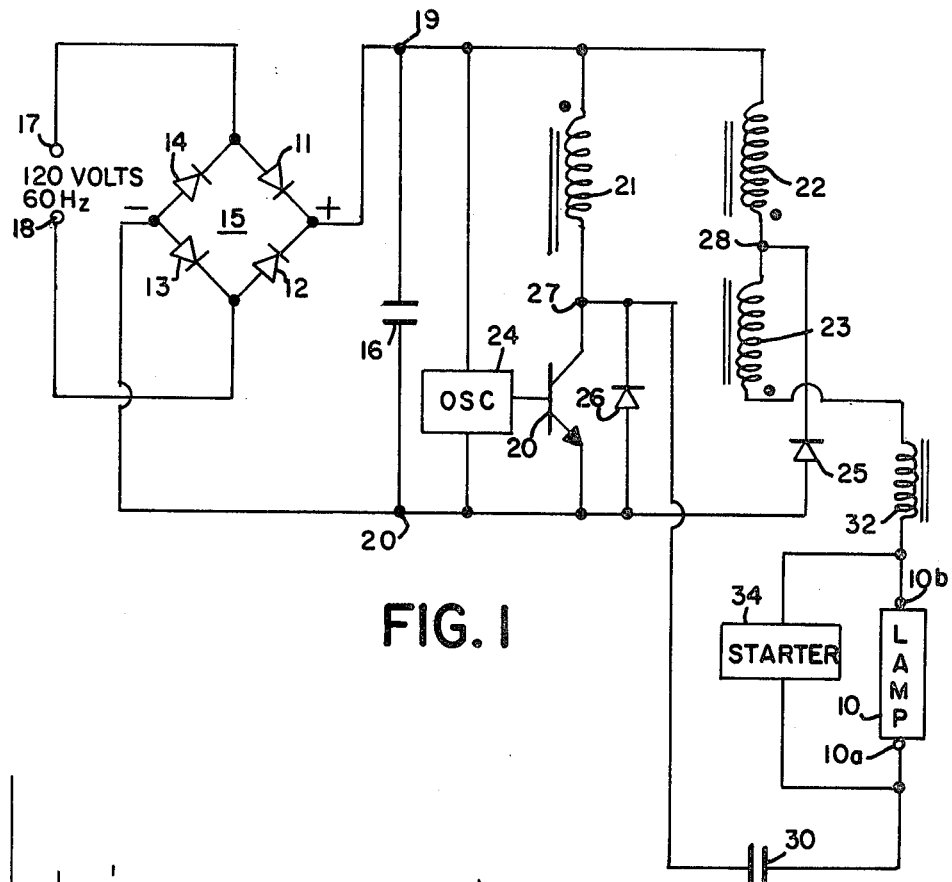
FIG. 1 is a circuit diagram of a lamp operating circuit showing an embodiment of the invention.

Referring now to the drawings, and particularly to FIG. 1, there is shown a circuit diagram illustrating an embodiment of the high frequency ballast circuit of the invention for operating a low wattage, HID arc discharge lamp 10, e.g., such as the low wattage metal halide arc discharge lamp described in the aforementioned copending application Ser. No. 132,933. The circuit comprises a DC power source consisting of a full wave bridge rectifier 15, comprising diodes 11, 12, 13 and 14 arranged in a conventional manner as shown, and a filter capacitor 16 connected across the output of the bridge rectifier. The input terminals 17 and 18 of the bridge circuit are connected to an AC line source, e.g., 120 volts, 60 Hz. Accordingly, the peak voltage across the filtered output terminals 19 and 20 of the DC power source is about 160 volts.

The DC output is converted to a stepped up AC output to the lamp circuit by means of an oscillator driven switching transistor 20 in combination with inductance means 21, 22 and 23. These three inductance means may comprise respective windings on a common core. The winding sense is conventionally indicated by a point at the appropriate end of the windings. The collector emitter electrodes of transistor 20 are series connected with the inductance winding 21, as shown, across the output terminals 19 and 20 of the DC power source, and the output of an oscillator 24, powered by the DC source, is coupled to the base electrode of transistor 20 to repetitively render the transistor conducting at predetermined intervals. For example, according to a preferred embodiment, the oscillator 24 has an output frequency in the order of 20 kilohertz, whereby the controlled transistor switch 20 is driven to the conducting state at predetermined fixed intervals at the rate of 20,000 times per second. Inductance winding 22 is coupled across the output terminals 19 and 20 of the DC power source through a series-connected diode 25, which functions to prevent the voltage across the transistor collector emitter electrodes from exceeding a predetermined value. In the preferred embodiment, the diode 25 prevents the voltage across the transistor from exceeding two times the supply voltage, or about 320 volts. The circuit further includes a diode 26 which is connected, as shown, across the collector-emitter electrodes of the transistor for providing a reverse current bypass. The inductance windings 21 and 22 function as a step-up transformer and together with transistor 20 comprise a conventional inverter circuit, with the AC output of the inverter being taken across terminals 27 and 28. In the preferred embodiment, the windings 21 and 22 provide a peak to peak AC voltage output across terminals 27 and 28 which is about double that of the AC source, or about 320 volts. In this instance, a further step-up in the voltage applied across the lamp to about two and a half times that of the DC power source, or about 400 volts peak to peak, is provided by the inductance winding 23, which is series coupled between the inverter terminal 28 and the lamp 10.

In accordance with the present invention, lamp 10 is connected across the inverter output terminals by means including a ballast capacitor 30 coupled between inverter terminal 27 of inductance section 21 and terminal 10a of the lamp. The second terminal, 10b, of the lamp is coupled through a specially selected series inductance means 32 to one end of the inductance section 23, which in turn is series connected to inverter terminal 28 of inductance section 22. Inductance means 32 may comprise a separate coil winding; however, in a preferred embodiment inductance 32 along with inductance means 21, 22 and 23, comprise respective windings on a common core.

Figure 2:
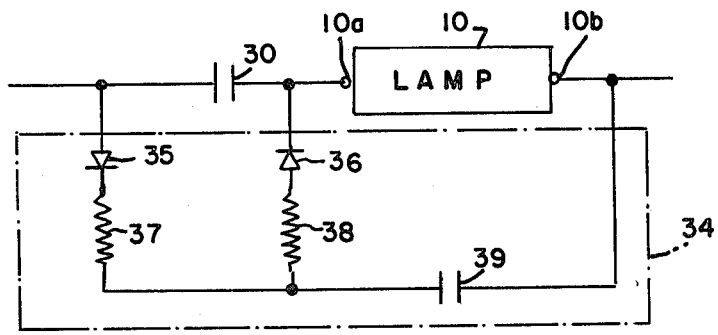
FIG. 2 is a circuit diagram of the starter circuit shown in FIG. 1.

Initial ignition of lamp 10 is promoted by a voltage multiplier type starting circuit 34 which is connected across the lamp terminals 10a and 10b. A number of starting circuit implementations may be used for this application, and one embodiment of a starting circuit is illustrated in FIG. 2 in cooperation with the portion of the FIG. 1 circuit including lamp 10 and ballast capacitor 30. The circuit is a conventional DC voltage doubler comprising a pair of diodes 35 and 36 and respective series resistors 37 and 38 connected as illustrated with a capacitor 39. In one specific embodiment, diodes 35 and 36 were Varo type VA20X, resistors 37 and 38 were 330K ohms, and capacitor 39 had a value of 0.033 microcarads. Ballast capacitor 30 was selected to have a value of 0.022 microfarads (800 volts), and the ballast inductance 32 was an 80 turn winding having an inductance value of about 0.47 millihenries at 1 KHz. The HID arc discharge lamp 10 had a power rating of about 40 watts, and the inverter provided a lamp operating supply of about 400 volts peak to peak at 20 KHz. With the initial open circuit across the lamp terminals, the voltage doubler action of the starting circuit 34 is operative to double the 400 volt inverter output to provide an 800 volt DC bias voltage. The inverter output voltage added to this DC bias level promotes initial ignition of the lamp. Once the lamp is in normal operation and conducting, it substantially shorts out the starting circuit to render the voltage doubler starter 34 essentially inoperative during normal lamp operation.

Figure 3:
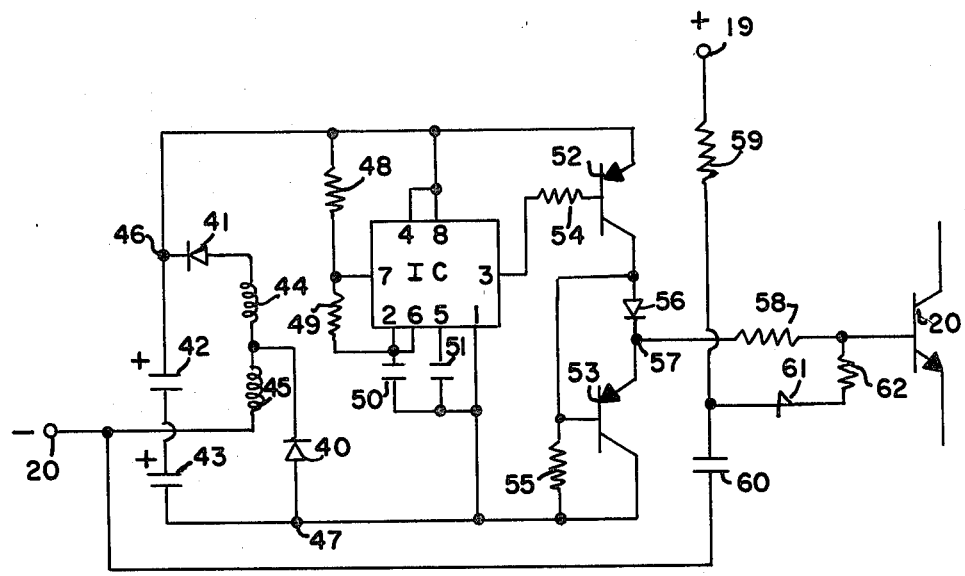
FIG. 3 is a circuit diagram of the oscillator circuit shown in FIG. 1.

Any of a number of conventional implementations may be employed for the oscillator circuit 24, and one particular embodiment is shown in FIG. 3. The circuit comprises a timing network consisting of a 555 type integrated circuit (IC) and associated circuitry. An example of such an integrated circuit is type NE555, available commercially from Signetics Corporation.

The DC power supply for this oscillator circuit comprises diodes 40 and 41, capacitors 42 and 43, and the inductors 44 and 45. Typically such a circuit supply provides a voltage $V_p$ in the order of $+6$ volts at terminal 46 and in the order of $-4$ volts at terminal 47. In a specific embodiment, diodes 40 and 41 were type 1N4002 (General Electric type DT230A have also been used); capacitors 42 and 43 were 22 microfarads (10 volts), inductance 44 was a single turn winding and inductance 45 was a double turn winding, wound so as to be coupled to winding 21 (FIG. 1).

An RC timing circuit associated wth the IC comprises resistors 48 and 49, and capacitors 50 and 51. The oscillator output stage comprises a push-pull amplifier which includes transistors 52 and 53, resistors 54 and 55 connected to respective base electrodes of the transistors, and a diode 56. In a specific embodiment, resistor 48 was 4.7K ohm; resistor 49 was 470 ohm; capacitors 50 and 51 were 0.01 microfarad; transistors 52 and 53 were Motorola type MPSU51A; resistors 54 and 55 were 150 ohm; and diode 56 was a type 1N914 (General Electric type DT230A has also been used).

The pins indicated for the illustrated IC circuit have the following functions: Pin 1 is the power supply common (negative) voltage; pin 2 is the trigger input; pin 3 is the output voltage; pin 4 is the reset input; pin 5 is a modulation input (we are not using the modulation input, but the 0.01 microfarad capacitor 51 is connected to prevent noise coupling); pin 6 is the threshold input; pin 7 is the discharge output; and pin 8 is the positive power supply input. The IC consists of a bistable circuit whose output voltage is either high (near positive power supply voltage) or low (near common or negative power supply voltage). The circuit is triggered into the high state when the voltage at trigger pin 2 goes below $\frac{1}{3} V_p$. The circuit is triggered into the low state when the voltage at the threshold pin 6 goes above $\frac{2}{3} V_p$. The discharge pin 7 exhibits a short circuit to the power supply common (pin 1) when the circuit is in the low state.

The timing network associated with the IC forms an astable multivibrator. It will be noted that pins 2 and 6 are both connected to timing capacitor 50. Thus, when the voltage on capacitor 50 goes higher than $\frac{2}{3} V_p$, threshold input pin 6 will cause the output voltage (pin 3) to go low and the discharge output (pin 7) shorts to pin 1. When the voltage on capacitor 50 goes below $\frac{1}{3} V_p$, the trigger input (pin 2) will cause the output voltage to go high, and the short between the discharge output and pin 1 is removed, i.e., the discharge output is turned off. In the operation of this circuit, assuming that the voltage on capacitor 50 has dropped to $\frac{1}{3} V_p$, the output voltage at pin 3 is then high, and the discharge output (pin 7) is turned off. Then capacitor 50 will charge through resistors 48 and 49 with a time constant $(R_{48}+R_{49})C_{50}$. When the voltage on capacitor 50 reaches $\frac{2}{3} V_p$, the output voltage will go low, and pin 7 is shorted to pin 1, resulting in discharge of capacitor 50 through resistor 49 and pins 7 and 1 with a time constant $R_{49}C_{50}$. When the voltage on capacitor 50 reaches $\frac{1}{3} V_p$, the cycle begins again.

The output of the push-pull amplifier of the oscillator circuit, obtainable at the junction 57 of diode 56 and the emitter of transistor 53, is coupled through a resistor 58 to the base electrode of the switching transistor 20. Resistor 58 is selected to provide base current control and, in a specific embodiment, had a value of 6.8 ohms. The oscillator starting circuit comprises a resistor 59 and capacitor 60 series connected in that order between terminals 19 and 20 of the DC power source of FIG. 1. The junction of resistor 59 and capacitor 60 is connected through a breakdown diode 61 and resistor 62 to the base of transistor 20. In a specific embodiment, resistor 59 was 2.2 megohms; capacitor 60 was 0.2 microfarads; breakdown diode 61 was a type 2N4988; and resistor 62 was 47 ohms.

The timing operation of the oscillator is such that at time $t_1$, the IC-amplifier goes high, turning on the transistor switch 20. At time $t_2$, the IC-amplifier goes low, turning off transistor switch 20, thus producing a current pulse at collector output between $t_1$ and $t_2$. The cycle is repeated beginning at time $t_3$. The time interval $t_1$ to $t_2$ (when transistor 20 is turned on and conducting) is determined by the time constant $R_{49}C_{50}$, and the time interval $t_2$ to $t_3$ (when transistor 20 is turned off and non-conducting) is determined by the time constant $(R_{48}+R_{49})C_{50}$. In one specific embodiment, the on-time of transistor 20 is about 8 microseconds, and the off period of transistor 20 is about 40 microseconds.

Returning now to FIG. 1, the inductance winding 21 is selected to have an inductance value sufficient to store an amount of energy approximately equal to W/f during the conducting period of transistor 20, where W is the power rating of the lamp and f is the frequency of the oscillator. Hence, in the specific embodiment described as an example, the stored energy was approximately equal to (40 watts)/(20,000 Hz) joules.

The value of the ballast capacitor 30 is selected so that the peak voltage across transistor switch 20 during the non-conducting period of the transistor is approximately double the output voltage of the DC power source. Thus, in the specific example described, the peak voltage across the transistor switch during the off-time is approximately double 160 volts, or about 320 volts.

Figure 4:
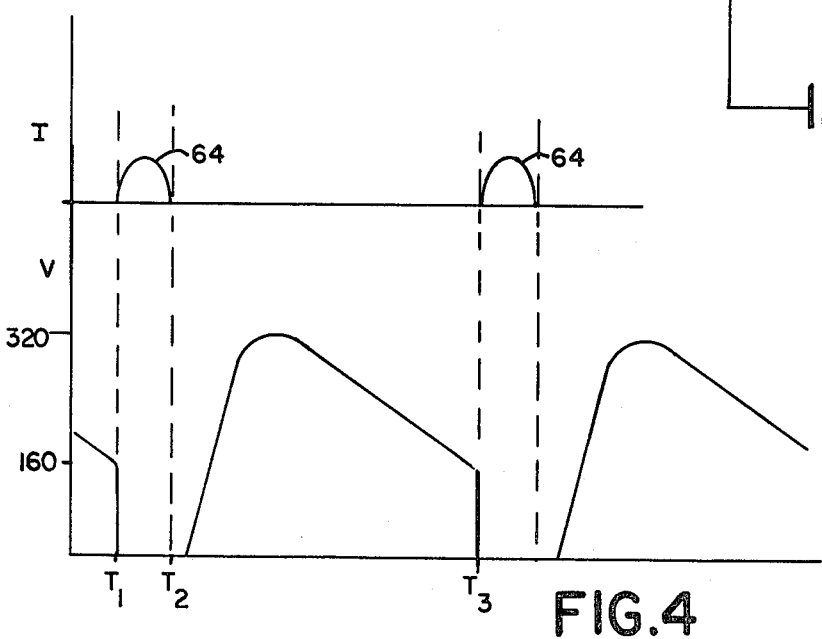
FIG. 4 shows current and voltage waveforms relating to the operation of the FIG. 1 circuit.

Referring to the current and voltage waveforms of FIG. 4, the ballast inductance winding 32 is selected to resonate with the ballast capacitor 30 whereby the switching current waveform is substantially a half sinewave pulse 64, with both the turn-on ($t_1$) and turn-off ($t_2$) transition of the transistor switch 20 occurring at zero current. Stated another way, the ballast inductance 32 and ballast capacitor 30 are selected to resonate sinusoidally at a frequency having a half period which coincides with the on-time ($t_1$–$t_2$) of the transistor 20. In this manner, the significant switching losses typically encountered in such inverter switches are substantially eliminated. The period ($t_2$–$t_3$) represents the off period of transistor 20.

Now when the transistor 20 is turned on, lamp 10 has a very low dynamic impedance, and capacitor 30 is essentially a short circuit at high frequencies. Hence, the current rise in the lamp circuit must be controlled and means must be provided such that all of the voltage will not appear across the conducting transistor 20, which would result in a substantial power loss. Accordingly, inductance 32 provides the additional essential function of being operative during the conducting period of the transistor switch to provide an impedance load in the lamp circuit for permitting full conduction of the transistor switch with a minimized power loss. Of course, the series choke effect of inductance 32 also functions as a ballasting current control mechanism. Inductance 32, therefore, is crucial to providing efficient transistor switching operation, and thus enhanced system efficiency. Inductance 32 also provides a current waveform smoothing function, as otherwise, the series ballast capacitor 30 would result in a very high crest factor. On the other hand, the ballast capacitor 30 assists in eliminating the problem of lamp rectification that occurs with pure inductive ballasts.

In the specific embodiment of the circuit previously set forth as an example, diodes 11–14 were type 1N4004; capacitor 16 was 50 microfarads, (200 volts); winding 21 had 45 turns; winding 22 had 45 turns; winding 23 had 30 turns; diodes 25 and 26 were GE type A114D; and the power transistor 20 was a Motorolla type MJE13009.

As previously described, conductance 32 comprised a winding of 80 turns about a core and had an inductance of about 0.47 millihenries at 1 KHz and ballast capacitor 30 was 0.022 microfarad (800 volts).

In the specific embodiment operating the lamp at 20 KHz, it was observed that the reignition voltage was substantially reduced, the transit time for the lamp current through the zero point being much shorter than for conventional 60 Hz operation. The operation of this specific embodiment was also observed to enhance discharge ignition, nearly eliminate reignition voltages, and have a power conversion efficiency of 85%.

Although the invention has been described with respect to a specific embodiment, it will be appreciated that modifications and changes may be made by those skilled in the art without departing from the true spirit and scope of the invention. For example, although a particular type of controlled switch 20 is shown and described, it will be understood that other types of controlled switches may be employed for this component. Also the windings for the inductance means 21 and 22 may be bifilar, or even the trifilar when in combination with inductance means 23. Further, it may be found advantageous to have windings 21, 22 and 23 on one toroidal core, while the winding 32 is on a separate toroid.

We claim:

1. An operating circuit for a high intensity discharge lamp, said circuit comprising, in combination:

a DC power source having first and second output terminals;

a first inductance means and a controlled switch means series-connected in that order between the first and second output terminals of said DC power source;

a second inductance means and a first diode series-connected in that order between the first and second output terminals of said DC power source, said second inductance means being transformer-coupled to said first inductance means;

an oscillator coupled to said a controlled switch means for respectively operating the same at predetermined intervals, whereby said controlled switch means and first and second inductance means function as an inverter having and AC output across the combination of said first and second inductance means, the junction of said first inductance means and said controlled switch means comprising a first inverter output terminal, and the junction of said second inductance means and said first diode comprising a second inverter output terminal;

and means for connecting first and second terminals of a low wattage high intensity discharge lamp across said inverter output terminals; said connecting means including a ballast capacitor means coupled between said first inverter output terminal and the first terminal of said lamp, and a ballast inductance means coupled between said second inverter output terminal and the second terminal of said lamp;

said ballast inductance means being selected to resonate with said ballast capacitor means at a frequency having a half period which coincides with the on-time of said controlled switch means whereby the switching current waveform is substantially a half sinewave pulse, with both the turn-on and turn-off transition of said switching means occurring at zero current, thereby substantially eliminating switching losses, said ballast inductance means being operative during the conducting period of said switch means to provide an impedance load in the lamp circuit for permitting full conduction of said switch means with a minimized power loss.

2. The circuit of claim 1 further including a voltage multiplier starting circuit connected across said first and second terminals of the lamp, said starting circuit being substantially shorted out during normal operation of said lamp.

3. The circuit of claim 1 further including a second diode means connected across said controlled switch means.

4. The circuit of claim 3 further including a third inductance means connected between said ballast inductance means and the junction of said second inductance means and first diode means, said third inductance means being transformer-coupled to said first and second inductance means, whereby said ballast inductance means, said lamp and said ballast capacitor means are series-connected across the combination of said first, second and third inductance means, said third inductance means functioning to further step up the voltage applied across said lamp, and said first inductance means has an inductance value selected to store an amount of energy approximately equal to W/f during the conducting period of said switch means, where W is the power rating of said lamp and f is the frequency of said oscillator.

5. The circuit of claim 4 wherein said oscillator frequency is in the order of 20 kilohertz.

6. The circuit of claim 4 wherein the capacitance value of said capacitor means is selected so that the peak voltage across said switch means during the non-conducting period thereof is approximately double the output voltage of said DC power source.

7. The circuit of claim 1 wherein said controlled switch means is a transistor having base, collector and emitter electrodes, said base being coupled of the output of said oscillator, and said collector and emitter electrodes being coupled in a series circuit between the first inductance means and the second output terminal of said DC power source, and further including a second diode connected across the emitter and collector electrodes of said transistor as a reverse current bypass, said first diode being selected to prevent the voltage across said transistor collector-emitter electrodes from exceeding a predetermined value.

8. The circuit of claim 7 further including a third inductance means connected between said ballast inductance means and the junction of said second inductance means and first diode, and wherein said first, second, third and ballast inductance means comprise respective windings on a common core.

* * * * *